United States Patent [19]

Mathews et al.

[11] Patent Number: 4,487,003
[45] Date of Patent: Dec. 11, 1984

[54] MULTIPLE ROTOR MOWERS

[76] Inventors: Bernard C. Mathews, Crystal Lake, Ill.; Violet E. Matthews, administrator, 8606 Rte. 176, Crystal Lake, Ill. 60014

[21] Appl. No.: 471,264

[22] Filed: Mar. 2, 1983

[51] Int. Cl.³ .................................... A01D 35/26
[52] U.S. Cl. ................................ 56/13.6; 56/12.7; 56/192
[58] Field of Search .............. 56/13.6, 15.9, 6, 295, 56/192, 17.5, 12.7, 370, DIG. 21

[56] References Cited

U.S. PATENT DOCUMENTS

| | | | |
|---|---|---|---|
| 3,905,182 | 9/1975 | Geier | 56/13.6 |
| 3,995,416 | 12/1976 | van der Lely | 56/370 |
| 4,007,578 | 2/1977 | Borstel, Jr. | 56/192 |
| 4,177,625 | 12/1979 | Knight et al. | 56/13.6 |
| 4,218,865 | 8/1980 | Chaumont et al. | 56/13.6 |
| 4,292,789 | 10/1981 | Mathews | 56/13.6 |
| 4,292,790 | 10/1981 | Mathews | 56/13.6 |

Primary Examiner—Jay N. Eskovitz
Attorney, Agent, or Firm—Thomas W. Speckman

[57] ABSTRACT

A multiple rotor mower having a plurality of substantially side-by-side vertically disposed rotors each having a horizontally disposed disc at their lower ends and mowing blades beneath the discs, the discs being segmented into readily detachable and replaceable disc portions for easy replacement of any disc portions damaged by contact with rocks. Closed ground engaging skids are provided beneath discs, the ground engaging skids being formed from two dish-shaped portions having a fastening flange extending outwardly from their adjacent open ends so that the bottom portion of each disc is readily detachable and replaceable providing replacement of the bottom portion of the ground engaging skid when damaged or to obtain different height adjustments of the mower rotor assemblies. The mower rotor assembly is spring suspended from an overhead support arm from the mower frame reducing the force of the ground engaging skids upon the ground.

33 Claims, 7 Drawing Figures

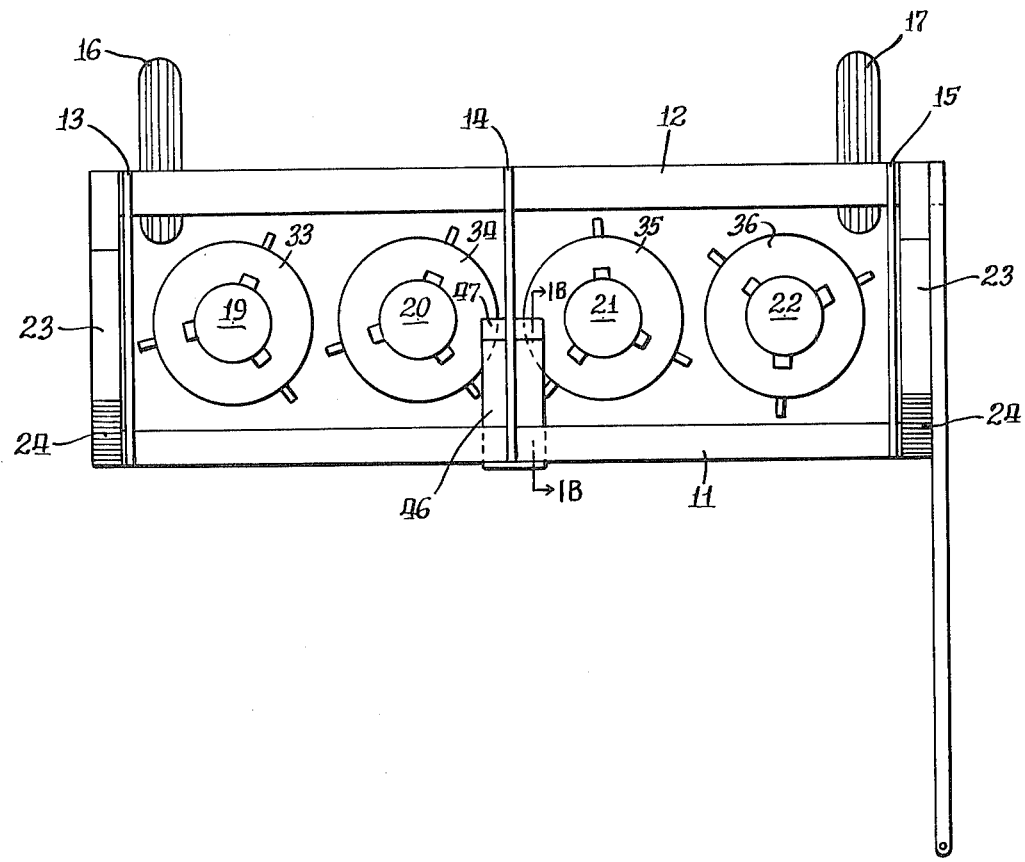
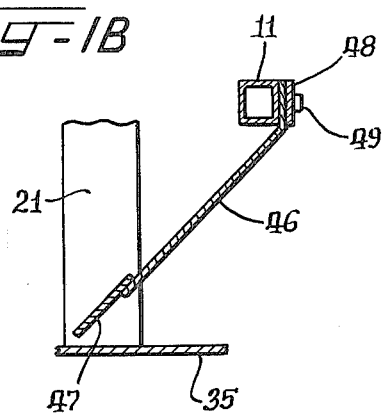

MULTIPLE ROTOR MOWERS

BACKGROUND OF THE INVENTION

1. Field of the Invention

This invention relates to multiple rotor mowers of the type used for cutting hay and grasses and is especially suited for use in combination with a crop conditioner.

A plurality of substantially side-by-side vertically disposed rotors each have a horizontally disposed disc at their lower ends and mowing blades associated therewith. Adjacent rotors with their associated discs rotate in opposite directions to effect a windrowing of the cut hay and grasses between adjacent cooperative discs and rotors. The present invention utilizes a mower having the plurality of discs in substantially the same horizontal plane and horizontally disposed blade portions of cutting members extending radially beneath the discs, the cutting members being vertically adjustable along the side of the vertically disposed rotors. Vertical displacement of the blade portions of the cutting knives extending beneath the discs avoids contact between the blades associated with adjacent discs and rotors.

The present invention provides segmented, readily detachable and replaceable disc portions for easy replacement of any disc portions damaged by contact with rocks, or the like. Further, the mower of this invention provides for closed ground engaging skids beneath each disc, the ground engaging skids being formed from two dish-shaped portions having a fastening flange extending outwardly from their adjacent open ends. The ground engaging skids of this construction beneath each of the discs provides protection to the most vulnerably damaged portion of the cutting members. The bottom portions of the ground engaging skids are readily detachable and replaceable providing easy replacement of the portions of the ground engaging skids which may be most likely damaged and providing easy replacement of the bottom portion of the ground engaging skids to enable different height adjustments of the mower rotor assemblies. The mower assembly is spring suspended from an overhead support arm reducing the force of the ground engaging skids upon the ground.

2. Description of the Prior Art

My own prior U.S. Pat. No. 4,292,790 teaches multiple rotor mowers having horizontally disposed discs at the bottom of the rotors wherein the discs are aligned in a horizontal plane. However, the U.S. Pat. No. 4,292,790 solves the problem of avoiding contact of mowing blades of adjacent discs by locating the mowing blades of one set of alternate discs at the top side of the discs and locating the mowing blades of a second set of alternate discs at the underside of the discs. This arrangement has the disadvantage of requiring an upper shield over each of the mowing blades located above the discs. Further, the U.S. Pat. No. 4,292,790 teaches dish-shaped open ground skids beneath only alternate rotors, the opening at the top having the disadvantage of collecting foreign materials. Additionally, the ground skids as shown in the U.S. Pat. No. 4,292,790 are not readily replaced nor readily adjustable as to height. The prior U.S. Pat. Nos. 3,389,539; 3,391,522; 3,443,369; and 3,550,360 disclose the general feature of an aligned series of rotors extending transversely to the line of travel of the mower with radially extending blades which coact with each other and with adjacent blades to effect cutting of hay and grasses. Each of the prior mowers taught by these patents must be provided with rotors having "timed" rotational drives to avoid blade contact. U.S. Pat. No. 3,389,539 teaches open top saucer-shaped ground skids beneath each mower rotor with associated canted blades, but these open, ground skids have the same disadvantages pointed out above. U.S. Pat. No. 4,177,625 teaches flat ground engaging skids which are coupled to each other at their adjacent sides forming a rigid transverse structure beneath the cutter units.

My own prior U.S. Pat. No. 4,160,356 shows rotary mowers which have canted rotors to avoid blade contact between adjacent rotors without requiring timing of the drive of the rotors.

My own prior U.S. Pat. No. 4,292,789 teaches L-shaped spring wire blades for use on rotary type mowers, however, the blades associated with adjacent mowing rotors do not overlap in their paths of rotation.

SUMMARY OF THE INVENTION

It is an object of this invention to provide multiple rotor mowers of the type having a plurality of substantially side-by-side vertically disposed rotors with drive means for imparting rotory motion to the rotors in their upper portion and horizontally disposed discs at their lower portions wherein the discs of adjacent rotors are in substantially the same horizontal plane, the discs being segmented of separate component pieces readily detachably fastened to the associated rotor affording easy replacement of damaged portions of the disc.

Another object of this invention is to provide multiple rotor mowers having the above described segmented discs in the same horizontal plane with all of the blade portions of cutting members disposed horizontally beneath the segmented discs and vertically displaced on adjacent rotors.

Yet another object of this invention is to provide a multiple rotor mower having closed ground engaging skids disposed beneath the discs at the bottom of the rotors, the closed ground engaging skids comprising an upper concave member and a lower concave member, each having a flange at its open end outer periphery, the upper concave member being mounted on an associated rotor with its concavity open to the bottom, and the lower concave member with its concavity open to the top being readily detachably fastened to the upper concave member in the area of the flanges. This allows ready replacement of the bottom portion of the closed ground engaging skid necessitated by damage or desire to change the height of the cutting blades from the ground surface.

It is another object of this invention to provide closed ground engaging skids beneath each disc of a multiple rotor mower, the closed skids providing protection to the cutting members from damage by rocks and ground irregularities.

Another object of this invention is to provide a multiple rotor mower having closed ground engaging skids beneath each mower rotor, the force of such skids against the ground surface being reduced by the mower header assembly being in pivotal engagement with the frame structure at the rear of the mower and spring suspended from an overhead support arm at its forward end.

BRIEF DESCRIPTION OF THE DRAWINGS

The above and other objects and advantages of this invention will be apparent from the following detailed disclosure and reference to the drawings wherein:

FIG. 1A is a top view of the mower shown in FIG. 1 with the driving mechanism removed for simplicity;

FIG. 1B is a partial sectional view along lines 1B—1B shown in FIG. 1A;

FIG. 5 is a side view, partially cutaway showing spring suspension of the forward end of the mower header assembly.

DESCRIPTION OF PREFERRED EMBODIMENTS

Figure 1:
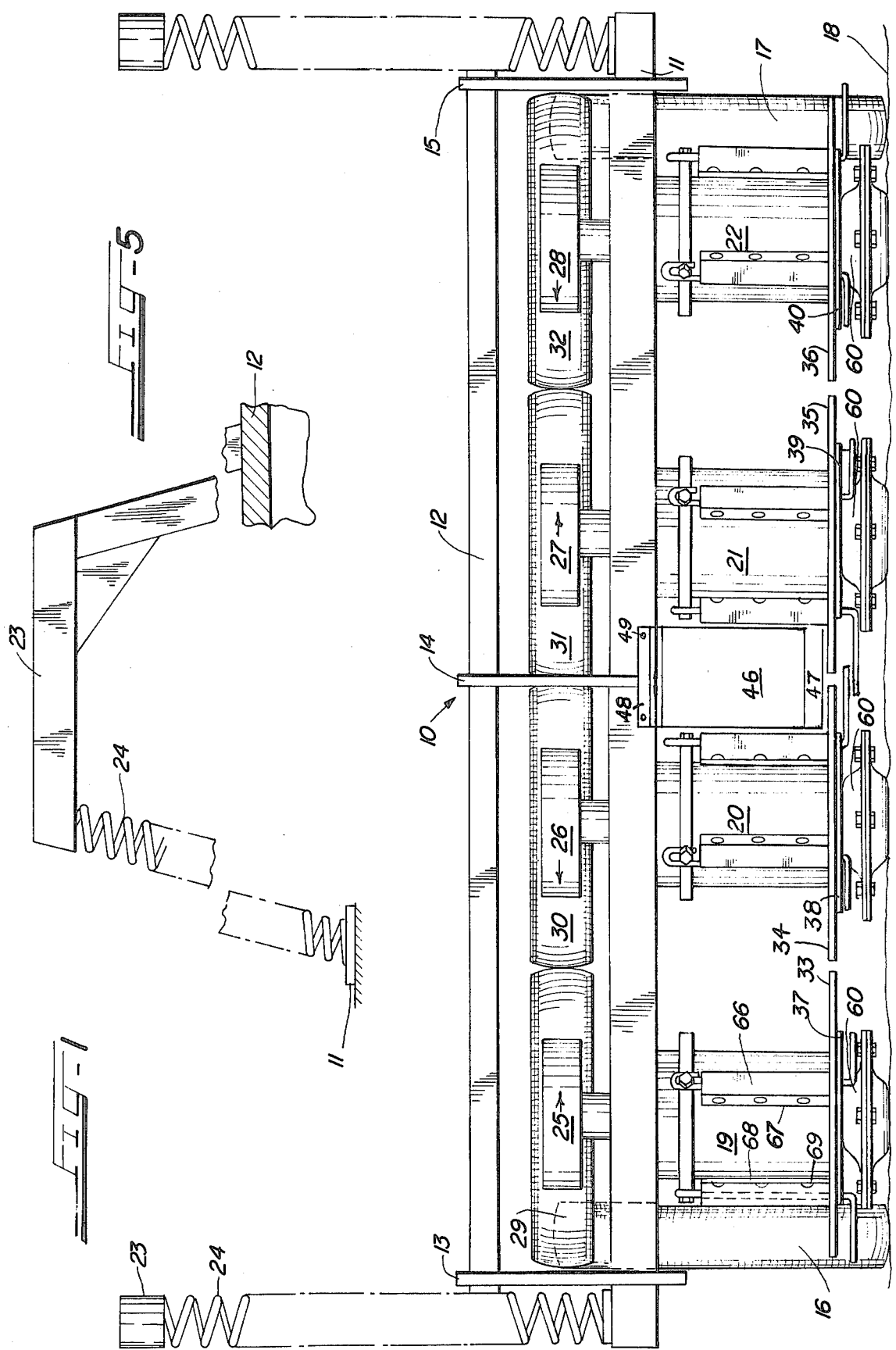
FIG. 1 is a front view of a mower according to one embodiment of this invention having a plurality of side-by-side mowing rotors.

Referring to FIGS. 1, 1A and 5, frame structure 10 is carried on ground engaging wheels 16 and 17. The frame structure includes upper frame transverse beam 12 and overhead support arm 23. Transverse mower header beam 11 and the mower header assembly are maintained in pivotal engagement with frame structure 10 at the rear of the mower by vertical frame members 13, 14, and 15 and the front end of the mower header assembly is suspended by spring 24 from the end of overhead support arm 23. The manner of suitable pivot connection is readily apparent and does not need to be further shown here. Likewise, not shown in the drawings is a suitable drawbar and tractor hitch with associated power take off drives for the mower. An example of a suitable drawbar and power drive are shown in my U.S. Pat. No. 4,160,356. The surface of the ground over which the mower travels is shown by numeral 18.

A plurality of substantially side-by-side vertically disposed rotors 19, 20, 21 and 22 are journally supported in mower header beam 11 and depend downwardly therefrom. While four rotors are shown in FIG. 1, any number of rotors may be employed, however, it is preferred that an even number of rotors be used, such as two, four, or six, so that adjacent rotors operate in opposite rotory motion providing cooperation to effect windrowing of the cut crop between the adjacent rotors. The desired windrowing effect is more fully described in my U.S. Pat. No. 4,292,789. By the terminology of the vertically disposed rotors being substantially side-by-side, I mean to include both rotors having their axes of rotation along a single transverse line as shown by my prior U.S. Pat. No. 4,292,789 or having their axes of rotation staggered and aligned in two transverse lines as shown by my prior U.S. Pat. No. 4,160,356. The latter arrangement provides greater overlap of the cutting swaths.

Desired windrowing effect is obtained by a pair of rotors moving in opposite rotary directions toward each other, as shown in FIG. 1, to provide cut crop to a crop conditioner behind the mower rotors. As viewed from the front of the mower (FIG. 1) adjacent rotors moving in opposite rotary directions away from each other create undesired air currents which blow light hay or grasses downwardly preventing desired mowing action. I have found such undesired air currents may be deflected upwardly by providing upwardly, forwardly, with respect to the direction of mower movement, inclined deflector 46, preferably with lower flexible portion 47, between adjacent mowing rotors moving in opposite rotary directions as viewed from the front of the mower. As shown in FIG. 1B, deflector 46 may be attached to mower header beam 11 by projecting frame 48 and bolts 49.

The upper portion of each mowing rotor 19, 20, 21 and 22 is provided with a driving cylinder 25, 26, 27 and 28, respectively, which are preferably driven by drive wheels 29, 30, 31 and 32 with pneumatic tires as more fully described in my prior U.S. Pat. No. 4,160,356. However, any suitable means for imparting rotory motion to drive cylinders 25, 26, 27 and 28 may be used.

Each of the mowing rotors 19, 20, 21 and 22 is provided in its lower portion with a larger diameter horizontally disposed disc 33, 34, 35 and 36, respectively. The discs lie in substantially the same horizontal plane and the circumferences of adjacent discs have a short space therebetween as shown in FIG. 1. The construction of the mower rotors is more fully described in my U.S. Pat. No. 4,292,790, incorporated herein in its entirety by reference. Any suitable construction of the mower rotor may be utilized except for the lower portion of the rotor as fully described herein.

Figure 2:
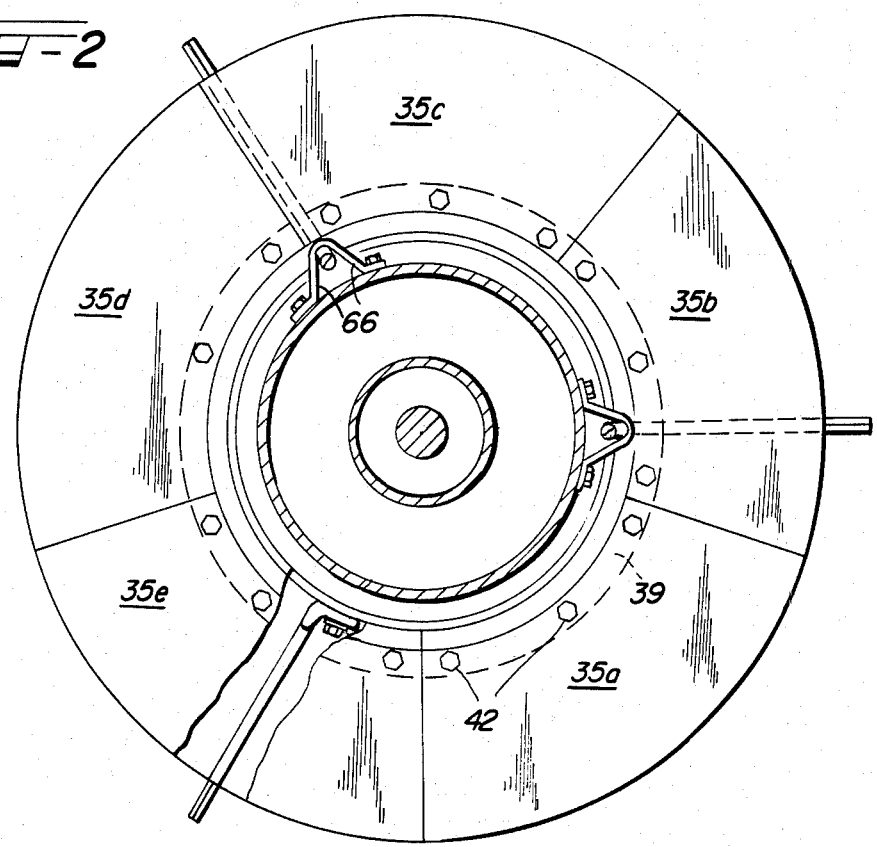
FIG. 2 is a top partially sectioned and cutaway view of one embodiment of a mowing rotor as shown in FIG. 1 showing the segemented discs.
Figure 3:
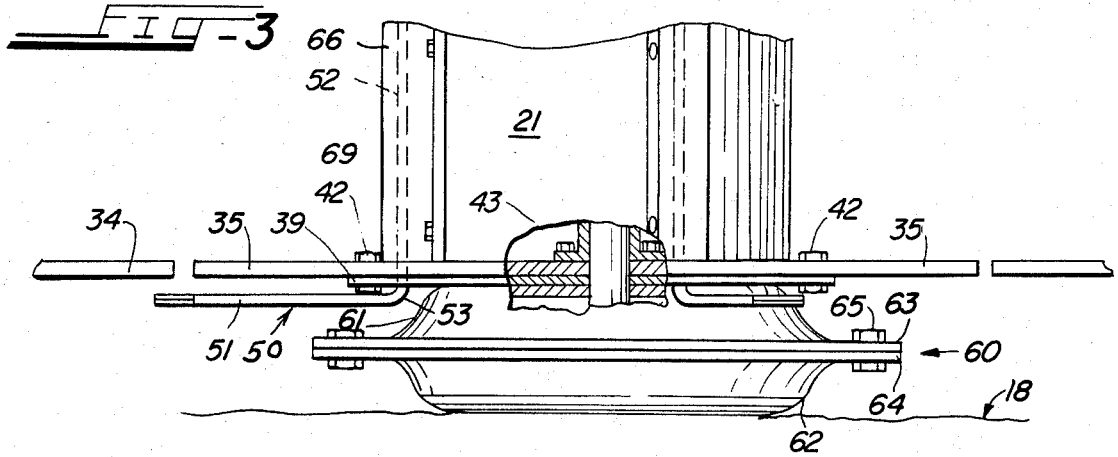
FIG. 3 is a side view, partially cutaway and sectioned, of the lower portion of a mowing rotor according to this invention showing the enclosed ground engaging skid fixedly mounted on the rotor.

As best seen in FIGS. 2 and 3, the bottom of rotor 21 is provided with horizontally disposed fastening bracket 39 extending radially therefrom. Bracket 39 is preferably a flat circular plate of greater diameter than rotor 21 and welded to the bottom of the tube forming rotor 21. Bracket 39 has suitable openings therethrough to permit removal of cutting member 50 comprising horizontally disposed blade portion 51 and vertically disposed mounting portion 52 from the upper side of the disc as more fully described in my prior U.S. Pat. No. 4,292,789. Horizontal bracket 39 may be any suitable flange shape fastened rigidly to mowing rotor 21 and extending radially therefrom.

An important feature of the present invention is that disc 35 comprises segmented portions, shown in FIG. 2 as 35a, 35b, 35c, 35d and 35e, each such disc portion being readily detachably fastened to horizontal fastening bracket 39. While five segmented disc portions are shown in FIG. 2, it is suitable to have any number of segmented disc portions, preferably about 3 to about 8 such disc portions, especially preferred is 6 disc portions. Each disc portion is readily detachably fastened to horizontal bracket 39 in any suitable fashion. One method is shown in FIGS. 2 and 3 as each disc portion, such as 35a, having a region overlapping with bracket 39 and having registered through holes with mating threaded screws and nuts 60 therethrough readily detachably fastening the disc portion to the bracket. A suitable number of such registered through holes and mating threaded screws and nuts are about 2 to 6 for each segmented disc portion, preferably 3 or 4. The abutting ends of the disc portions as shown in FIG. 2 are smooth and do not overlap, providing easy and separate removal of each disc portion for repair or replacement. It is also within the scope of this invention, particularly when lighter weight metal is used for the discs and when the diameters of the discs become large, to provide that one end of the abutting disc portion overlaps the adjacent disc portion on its lower side and to provide a through bolt therethrough for additional fastening toward the outer periphery of the disc portions. This will provide a smooth upper disc surface and a stiffer disc which can be made of lighter weight material, but the overlapping portion should not interfere with removal of a single disc portion for replacement. Formerly, discs at the lower portion of rotors of mowers have been an integral part of the rotor and difficult to replace. Since discs may be readily damaged by rocks and uneven ground surfaces, it is highly desirable to provide segmented discs wherein a damaged portion may be readily replaced.

In a preferred embodiment, as shown in FIG. 2, segmented disc portions 35a-e, have an inner radius which is outwardly of cutting member housing 66 to provide easy removal of both the disc portions and the cutting member and to provide that all of the disc portions may be identical.

Another important aspect of this invention is that all of the horizontally disposed blade portions 51 of cutting members 50 are disposed beneath the discs, such as 35. The cutting members are mounted to the rotor in a vertically adjustable fashion as more fully described in my prior U.S. Pat. Nos. 4,292,789 and 4,292,790. In the present invention the U-shaped mounting portion at the top of the cutting member is sufficiently long to provide easy vertical adjustment for obtaining vertical displacement of the blades beneath adjacent discs, allowing blades of adjacent rotors to pass one over the other without the need for timing mechanisms.

Figure 4:
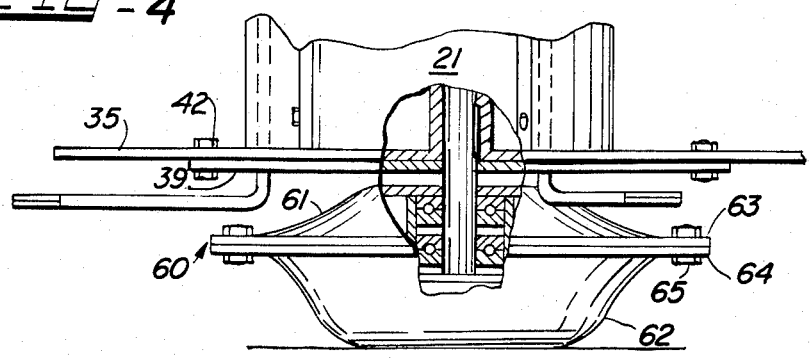
FIG. 4 is a side view, partially cutaway and sectioned, of the lower portion of a mowing rotor according to this invention showing a ground engaging skid journally mounted on the rotor.

Another important aspect of the present invention is the provision of hollow, closed ground engaging skids disposed beneath each disc. The hollow, closed ground engaging skids, as will be described further, provide protection to the horizontal blade portion 51 of the cutting members and particularly to the transition portion 53 between the horizontal and vertical portion of the cutting members which is especially susceptible to damage from rocks or ground surface variances. Further, the hollow, closed ground engaging skids according to this invention may have their bottom portion readily and easily replaced in case of damage or the bottom portions of the ground engaging skids may be easily replaced to accommodate different blade height requirements. As shown in FIG. 3, ground engaging skid 60 comprises upper concave member 61 and lower concave member 62. Upper concave member 61 has flange 63 at its open end outer periphery and lower concave member 62 has flange 64 at its open end outer periphery. Upper concave member 61 is mounted on an associated rotor with its concavity open to the bottom and lower concave member 62, with its concavity open to the top, is readily detachably fastened in the area of its flange 64 to the area of flange 63 of upper concave member 61 by registered through holes and mating threaded screws and nuts 65 therethrough. It is suitable for lower concave member 62 to be readily detachably mounted to upper concave member 61 by 3 to 7 threaded screws and nuts 65. Thus, by lifting the ground engaging skid slightly above the ground surface, the threaded screws and nuts may be readily removed and the entire lower concave member 62 replaced in case of damage or if a different configuration lower concave member were desired, such as to elevate the cutting blades. The two-piece inverted dish-shaped ground engaging skid members having a flange at their open ends both provides protection to the horizontal blade portion 51 of the cutting member, the flange being radially extendable for as far as desired beneath horizontal blade portion 50 and provides a smooth ground engaging shape of good structural strength. As shown in FIG. 3, upper concave member 61 is identical to lower concave member 62 in shape. However, as shown in FIG. 4, lower concave member 62 may be of any depth desired and need not be symmetrical with upper concave member 61.

Ground engaging skids 60 may be fixedly mounted on the rotor carrying the ground engaging skid as shown in FIG. 3 by bolts 43 fixedly attaching upper concave member 61 beneath fastening bracket 39. Upper concave member 61 may also be journally mounted on rotor 21 carrying ground engaging skid 60 as shown in more detail in FIG. 4 and in the manner further described in more detail in the description with respect to FIG. 2 of my U.S. Pat. No. 4,292,790. The journal mounting of the ground engaging skid is accomplished by fastenings only to upper concave member 61 and does not modify lower concave ground engaging member 62. The journal mounting of the ground engaging skid permits skid 60 to freely rotate or remain stationary. The ground engaging skids in addition to providing protection to the horizontal blade portions of the cutting members also provide ground support for the mower as it is driven over uneven ground. According to the present invention, such ground support for the mower is derived through ground engaging skids which may be used on each of the rotors. However, the closed ground engaging skids according to the present invention may also be used on only a portion of the mowing rotors, such as substituted for the ground engaging skids on alternate rotors as described in my U.S. Pat. No. 4,292,790.

The mower of this invention provides greater flexibility and simplification in manufacture by all of the components for each rotor-disc-cutting member-closed ground engaging skid assembly being identical. The mower of the present invention, while providing the advantages of the spring wire blades of my prior U.S. Pat. No. 4,292,789 and pneumatic tire drive of my prior U.S. Pat. No. 4,160,356, provides in addition a simplified series of side-by-side segmented discs all in substantially the same plane with all of the cutting knives beneath the discs. According to the present invention, greater protection is afforded to the knife portions of the cutting members located beneath the discs by the closed ground engaging skids completely protecting the transition area between the horizontal and vertical portions of the cutting members, the most vulnerable area to be damaged by rocks. Further, the ground engaging skids used in association with each of the mowing rotors in combination with the overhead spring suspension provides floating action of the mower unit over the ground surface reducing driving horsepower and possible slippage of the rotor drives. The closed gound engaging skids of this invention completely eliminate any problems of foreign materials becoming engaged in the upper open portions of formerly used open dish-shaped skid members.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A mower comprising: a frame structure carried on ground engaging wheels; a plurality of substantially side-by-side vertically disposed rotors depending downwardly from a mower header assembly structure; drive means mounted on said frame for imparting rotary motion to said rotors; each of said rotors having a horizontally disposed bracket at its lower end and a disc comprising segmented portions, each said disc portion readily detachably fastened to said horizontal bracket and said portions extending radially outwardly around said bracket forming a substantially horizontal plane segmented disc, said segmented discs of said plurality of rotors being all disposed in substantially the same horizontal plane, the diameters of each of said segmented discs being such that the circumferences of adjacent segmented discs have a short space therebetween; a plurality of cutting members associated with each of said rotors, each said cutting member comprising a horizontally disposed blade portion extending radially beneath said segmented discs and a vertically disposed mounting portion extending upwardly along said rotor and having adjustable mounting means in the upper portion thereof providing vertical adjustment of said horizontally disposed blade portions beneath said segmented discs; and a plurality of said discs having hollow, closed ground engaging skids disposed beneath said discs, each said ground engaging skid comprising an upper concave member and a lower concave member, each said concave member having a flange at its open end outer periphery, said upper concave member being mounted on an associated rotor with its concavity open to the bottom, said lower concave member with its concavity open to the top being readily detachably fastened in the area of said flange to the area of said flange of said upper concave member.

2. A mower as defined in claim 1 in which each segmented disc comprises 3 to 8 said disc portions.

3. A mower as defined in claim 2 wherein each said disc portion has a region overlapping said bracket, said overlapping region having 2 to 6 through holes registered with a corresponding number of through holes in said bracket and mating threaded screws and nuts therethrough readily detachably fastening said disc portion to said horizontal bracket.

4. A mower as defined in claim 1 wherein each said disc portion has a region overlapping said bracket, said overlapping region having 2 to 6 through holes registered with a corresponding number of through holes in said bracket and mating threaded screws and nuts therethrough readily detachably fastening said disc portion to said horizontal bracket.

5. A mower as defined in claim 1 wherein said horizontally disposed blade portions extend radially beyond the periphery of the associated segmented disc.

6. A mower as defined in claim 5 wherein the outer end portion of said horizontally disposed blade portion extends beneath an adjacent segmented disc during a portion of its rotary motion, the horizontally disposed blade portions associated with adjacent segmented discs being in different horizontal planes to allow passage of said outer end portions of said horizontally disposed blades associated with adjacent segmented discs.

7. A mower as defined in claim 1 having a plurality of cutting members associated with each of said rotors, each said cutting member comprising a horizontally disposed blade portion extending radially beneath said discs and a vertically disposed mounting portion extending upwardly along said rotor and having adjustable mounting means in the upper portion thereof providing vertical adjustment of said horizontally disposed blade portions beneath said discs.

8. In a mower as defined in claim 7 wherein said ground engaging skid extends radially outwardly beneath a portion of said horizontally disposed blade portions.

9. In a mower as defined in claim 7 wherein said ground engaging skid extends radially beneath the junctions of said vertically disposed mounting portion and said horizontally disposed blade portions of said cutting members.

10. In a mower as defined in claim 1 wherein said upper concave member of said ground engaging skid is fixedly mounted on said rotor carrying said ground engaging skid.

11. In a mower as defined in claim 1 wherein said upper concave member of said ground engaging skid is journally mounted on said rotor carrying said ground engaging skid.

12. In a mower as defined in claim 1 wherein said flange area of said upper concave member and said flange area of said lower concave member each have 3 to 7 registered through holes and mating, threaded screws and nuts therethrough readily detachably fastening said lower concave member to said upper concave member.

13. In a mower as defined in claim 1 wherein each of said rotors and associated discs has said ground engaging skid disposed therebeneath.

14. A mower as defined in claim 1 in which said mower header assembly structure is pivotally engaged with said frame structure in the rear portion of the mower, said frame structure having an overhead support arm extending upwardly and forwardly over said mower header assembly structure, and a spring extending downwardly from the forward portion of said arm suspending the forward portion of said mower header assembly structure.

15. A mower as defined in claim 1 in which adjacent rotors move in opposite rotary directions and having an upwardly, forwardly inclined deflector extending upwardly from close above said discs between adjacent rotors moving in opposite directions as viewed from the front of said mower to prevent blowing light crops downwardly in front of said mower.

16. In a mower having a plurality of substantially side-by-side vertically disposed rotors, the improvement comprising: each of said rotors having a horizontally disposed bracket at its lower end and a disc comprising segmented portions, each said disc portion readily detachably fastened to said horizontal bracket and said portions extending radially outwardly around said bracket forming a substantially horizontal plane segmented disc, said segmented discs of said plurality of rotors being all disposed in substantially the same horizontal plane, the diameters of each of said segemented discs being such that the circumferences of adjacent segmented discs have a short space therebetween; and a plurality of cutting members associated with each of said rotors, each said cutting member comprising a horizontally disposed blade portion extending radially beneath said segmented discs and a vertically disposed mounting portion extending upwardly along said rotor and having adjustable mounting means in the upper portion thereof providing vertical adjustment of said horizontally disposed blade portions beneath said segmented discs.

17. In a mower as defined in claim 16 in which each segmented disc comprises 3 to 8 said disc portions.

18. In a mower as defined in claim 17 wherein each said disc portion has a region overlapping said bracket, said overlapping region having 2 to 6 through holes registered with a corresponding number of through holes in said bracket and mating threaded screws and nuts therethrough readily detachably fastening said disc portion to said horizontal bracket.

19. In a mower as defined in claim 16 wherein each said disc portion has a region overlapping said bracket, said overlapping region having 2 to 6 through holes registered with a corresponding number of through holes in said bracket and mating threaded screws and nuts therethrough readily detachably fastening said disc portion to said horizontal bracket.

20. In a mower as defined in claim 16 wherein said horizontally disposed blade portions extend radially beyond the periphery of the associated segmented disc.

21. In a mower as defined in claim 20 wherein the outer end portion of said horizontally disposed blade portion extends beneath an adjacent segmented disc during a portion of its rotary motion, the horizontally disposed blade portions associated with adjacent segmented discs being in different horizontal planes to allow passage of said outer end portions of said horizontally disposed blades associated with adjacent segmented discs.

22. In a mower as defined in claim 16 in which adjacent rotors move in opposite rotary directions and having an upwardly, forwardly inclined deflector extending upwardly from close above said discs between adjacent rotors moving in opposite directions as viewed from the front of said mower to prevent blowing light crops downwardly in front of said mower.

23. In a mower having a plurality of substantially side-by-side vertically disposed rotors, each of said rotors having a horizontally disposed disc at its lower end, said discs of said plurality of rotors all disposed in substantially the same horizontal plane, the diameters of each of said discs being such that the circumferences of adjacent discs have a short space therebetween, the improvement comprising: a plurality of said discs having hollow, closed ground engaging skids disposed beneath said discs, each said ground engaging skid comprising an upper concave member and a lower concave member, each said concave member having a flange at its open end outer periphery, said upper concave member being mounted on an associated rotor with its concavity open to the bottom, said lower concave member with its concavity open to the top being readily detachably fastened in the area of said flange to the area of said flange of said upper concave member.

24. In a mower as defined in claim 23 having a plurality of cutting members associated with each of said rotors, each said cutting member comprising a horizontally disposed blade portion extending radially beneath said discs and a vertically disposed mounting portion extending upwardly along said rotor and having adjustable mounting means in the upper portion thereof providing vertical adjustment of said horizontally disposed blade portions beneath said discs.

25. In a mower as defined in claim 24 wherein said ground engaging skid extends radially outwardly beneath a portion of said horizontally disposed blade portions.

26. In a mower as defined in claim 24 wherein said ground engaging skid extends radially beneath the junctions of said vertically disposed mounting portion and said horizontally disposed blade portions of said cutting members.

27. In a mower as defined in claim 23 wherein said upper concave member of said ground engaging skid is fixedly mounted on said rotor carrying said ground engaging skid.

28. In a mower as defined in claim 23 wherein said upper concave member of said ground engaging skid is journally mounted on said rotor carrying said ground engaging skid.

29. In a mower as defined in claim 23 wherein said flange area of said upper concave member and said flange area of said lower concave member each have 3 to 7 registered through holes and mating, threaded screws and nuts therethrough readily detachably fastening said lower concave member to said upper concave member.

30. In a mower as defined in claim 23 wherein each of said rotors and associated discs has said ground engaging skid disposed therebeneath.

31. In a mower as defined in claim 23 in which adjacent rotors move in opposite rotary directions and having an upwardly, forwardly inclined deflector extending upwardly from close above said discs between adjacent rotors moving in opposite directions as viewed from the front of said mower to prevent blowing light crops downwardly in front of said mower.

32. In a mower having a plurality of substantially side-by-side vertically disposed rotors, each of said rotors having a horizontally disposed disc at its lower end, said discs of said plurality of rotors all disposed in substantially the same horizontal plane, the diameters of each of said discs being such that the circumferences of adjacent discs have a short space therebetween, the improvement comprising: said rotors disposed from a mower header assembly structure, said mower header assembly structure pivotally engaged with a mower frame structure in the rear portion of said mower, said frame structure having an overhead support arm extending upwardly and forwardly over said mower header assembly, and a spring extending downwardly from the forward portion of said arm suspending the forward portion of said mower header assembly structure.

33. In a mower having a plurality of substantially side-by-side vertically disposed rotors with adjacent rotors moving in opposite rotary directions, each of said rotors having a horizontally disposed disc at its lower end with the diameters of each of said discs being such that the circumferences of adjacent discs have a short space therebetween, and cutting means associated with each said rotor, the improvement comprising: an upwardly, forwardly inclined deflector extending upwardly from close above said discs between adjacent rotors moving in opposite directions as viewed from the front of said mower to prevent blowing light crops downwardly in front of said mower.

* * * * *